United States Patent [19]

Nakaniwa

[11] Patent Number: 4,987,877
[45] Date of Patent: Jan. 29, 1991

[54] METHOD AND APPARATUS FOR DETECTING INTAKE AIR STATE QUANTITY IN AN INTERNAL COMBUSTION ENGINE

[75] Inventor: Shinpei Nakaniwa, Isesaki, Japan

[73] Assignee: Japan Electronic Control Systems Co., Ltd., Isesaki, Japan

[21] Appl. No.: 492,836

[22] Filed: Mar. 13, 1990

[30] Foreign Application Priority Data

Mar. 13, 1989 [JP] Japan .................................. 1-57922

[51] Int. Cl.⁵ ........................ F02D 41/18; G01N 1/22
[52] U.S. Cl. .................................. 123/494; 73/118.2; 73/864.34; 364/510
[58] Field of Search ............... 123/478, 480, 490, 494; 73/118.2, 861.02, 861.03, 863.02, 864.34; 364/510, 557, 558, 581

[56] References Cited

U.S. PATENT DOCUMENTS

| 4,091,675 | 5/1978 | Jennison | 73/864.34 X |
| 4,407,251 | 10/1983 | Nakanishi | 123/490 X |
| 4,660,422 | 4/1987 | Eads et al. | 73/864.34 X |
| 4,683,539 | 7/1987 | Kanno et al. | 364/510 X |
| 4,713,765 | 12/1987 | Abe et al. | 364/510 X |
| 4,800,499 | 1/1989 | Ina et al. | 123/480 X |
| 4,860,222 | 8/1989 | Schmidt et al. | 364/510 X |

FOREIGN PATENT DOCUMENTS

58-150040 9/1983 Japan .

Primary Examiner—Willis R. Wolfe
Attorney, Agent, or Firm—Foley & Lardner, Schwartz, Jeffery, Schwaab, Mack, Blumenthal & Evans

[57] ABSTRACT

A method and apparatus for detecting an intake air state quantity in an internal combustion engine, where a detected value of an intake air state quantity participating in the quantity of air sucked in the engine, are dislosed. The method and apparatus are constructed so that a random number is generated, the frequency time of the above-mentioned sampling is variably set based on this random number, and the sampling frequency of the detected value of the intake air state quantity is randomly changed.

11 Claims, 5 Drawing Sheets

METHOD AND APPARATUS FOR DETECTING INTAKE AIR STATE QUANTITY IN AN INTERNAL COMBUSTION ENGINE

BACKGROUND OF THE INVENTION (1) Field of the Invention

The present invention relates to a method and apparatus for detecting the intake air state quantity in an internal combustion engine. More particularly, the present invention relates to a technique of improving the precision of detecting the intake air state quantity, such as an intake air flow quantity or intake pressure (suction negative pressure), as a parameter of an engine driving condition, for controlling the fuel supply quantity to the engine or the ignition timing of the engine.

(2) Description of the Related Art

As the apparatus for controlling the supply of a fuel into an internal combustion engine, there is known an apparatus in which a sensor for detecting the intake pressure (suction negative pressure) or the flow quantity of sucked air is arranged in the intake system and the quantity of a fuel supplied to the engine is set and controlled based on the intake pressure or intake air flow quantity detected by the sensor and the revolution number of the engine (Japanese Unexamined Patent Publication No. 58-150040).

In this apparatus, the intake pressure or intake air flow quantity pulsates under the influence of the suction and exhaustion of a cylinder. Accordingly, the timing of the sampling of the intake pressure or intake air flow quantity has great influence on the control of the engine. As the sampling timing, there has been adopted a timing corresponding to a revolution of a certain crank angle or a certain small time of, for example, about 1 to about 5 ms. If the sampling is carried out at a predetermined frequency, a pulsation of the pressure is caused at a frequency an integral number of times as large as this sampling frequency or at a frequency corresponding to one of an integral number of divisions of the sampling frequency, and in this case, only the lower end value or upper end value of the pulsation is sampled and the detection precision is reduced.

In the case where a pulsation is caused at a frequency slightly staggered from the sampling frequency of the certain small time, the sampling point in one frequency period of the pulsation is gradually staggered at every sampling frequency, and even at the stationary driving of the engine, sampling data are changed, and since the pulsation width is generally caused to such an extent as about 150 mmHg the air-fuel ratio changes in a quantity corresponding to this pulsation width. Furthermore, the change of the detected value caused by this gradual staggering of the point at every sampling results in a pulsation of a long period (for example, about 10 seconds). Therefore, even if such a processing as the calculation of the weighted mean is carried out, it is impossible to inhibit the change sufficiently. The matching of an optimal time of the sampling frequency at every revolution speed results in such defects as an increase in the number of steps and an increase of the memory capacity.

If the apparatus is constructed so that the intake pressure or intake air flow quantity is sampled at every position of a certain crank angle (for example, intake ATDC 90°), since the phase of the pulsation to the crank angle position is greatly changed according to the engine load or revolution speed, it often happens that a peak value is sampled or a mean value is sampled according to the driving state, and the reliability of the detected value is low. Furthermore, the chance of the renewal of the detected value is small and a detection responsibility cannot be ensured at the transient driving state.

Furthermore, if the apparatus is constructed so that the intake pressure is sampled at the time of ignition, since the crank angle position for sampling of the intake pressure is changed according to the change of the ignition time, even if the engine load or revolution speed is constant and the phase of the pulsation of the intake pressure to the crank angle position is constant, the sampled intake pressure is changed. Accordingly, even if the fuel supply is set and controlled by the intake pressure sampled at a certain ignition time so that a desired air-fuel controllability is obtained, if the ignition time is changed, the sampled intake pressure is greatly changed, and therefore, the air-fuel ratio controllability is drastically reduced with the result that even if the true intake pressure is constant a step is produced in the air-fuel ratio when the ignition time is changed.

SUMMARY OF THE INVENTION

It is a primary object of the present invention to solve the foregoing problems and provide a method and apparatus in which in sampling detected values from a sensor for detecting an intake air state quantity such as an intake pressure or intake air flow quantity, the maintenance of the detection responsibility at the transient driving state of an engine and the avoidance of the influence of a pulsation of sucked air can be realized without an increase of the step number.

A secondary object of the present invention is to attain the above object by a simple structure.

A third object of the present invention is to conveniently avoid the influence of the pulsation by appropriately processing the sampled detected value.

In accordance with the present invention, the foregoing objects can be attained by a method for detecting an intake air state quantity in an internal combustion engine, which comprises sampling at every predetermined time a detected value of an intake air state quantity participating in the quantity of sucked air in the internal combustion engine, wherein a random number is generated and the time of the sampling frequency is variably set based on the generated random number. According to this method, the time of the sampling frequency is randomly changed and the sampling of a detected value during one frequency of the pulsation is avoided.

The method of the present invention can be constructed so that the random number is generated based on lower order data of the detected value of the intake air quantity or on lower order data of a meter for measuring the time of the sampling frequency. If a random number is generated in this manner, it is not necessary to dispose individual random number generators, and the structure is simplified.

Furthermore, the method of the present invention can be constructed so that the time of the sampling frequency is set based on the sum of the above-mentioned random number and a predetermined fixed frequency time. If this structure is adopted, the sampling frequency time is variably set based on the fixed frequency time as the reference time.

Still further, the method of the present invention can be constructed so that a weighted mean value of detected values of the intake air state quantity, sampled at every frequency time variably set based on the random number, is calculated and the weighted mean value is set as the final sampled value. If this structure is adopted, the variation of the detected value sampled at a random frequency time is absorbed by this weighting.

Moreover, according to the present invention, in the above-mentioned weighting, the weighted mean is calculated by changing over the weighting load according to the discrimination of the stationary or transient driving state of the engine, whereby inhibition of the variation of the sampled detected value at the stationary driving state and the attainment of the detection responsibility at the transient driving state are simultaneously realized.

Still further, the method of the present invention can be constructed so that the time of the sampling frequency is variably set by variably setting the frequency of execution of the program for sample processing of the intake air state quantity based on the above-mentioned random number.

In accordance with another aspect of the present invention, there is provided an apparatus for detecting an intake air state quantity in an internal combustion engine which comprises intake air state quantity detecting means for detecting a quantity of a state of intake air which participates in the quantity of air sucked in the engine, random number generating means for selecting one numerical value among a plurality of numerical values in the substantially same probability, sampling frequency setting means for setting the time of the frequency of sampling the intake air state quantity, and state quantity sampling means which is actuated according to the sampling frequency time set by the sampling frequency setting means and which subjects the state quantity detected by the intake air state quantity detecting means to sampling processing and which sets the value obtained by the sample processing as a final detected value.

In the apparatus having the above-mentioned structure, the intake air state quantity detecting means detects the quantity of the state of sucked air which participates in the quantity of sucked air, such as an intake pressure or a sucked air flow quantity The random number generating means selects one numerical value among a plurality of numerical values in the substantially same probability and the sampling frequency setting means sets the time of the frequency of sampling the state quantity of sucked air based on the selected numerical value (random number). The state quantity sampling means is actuated according to the set time of the sampling frequency to subject the state quantity detected by the intake air state quantity detecting means to sampling processing and to set the value obtained by the sampling processing as a final detected value.

Namely, the state quantity of sucked air is sampled at every sampling frequency time corresponding to the numerical value (random number) selected by the random number generating means, and the sampling frequency time is not fixed but is randomly changed.

If the random number generating means is constructed so that a numerical value is selected based on lower order data of the state quantity detected by the intake air state quantity detecting means or on lower order data of a meter for measuring the working frequency of the state quantity sampling means, then random number generating means need not be individually disposed.

If the sampling frequency setting means is constructed so that the sampling frequency is set based on the sum of the numerical value selected by the random number generating means and the fixed time of the sampling frequency, the fixed time of the sampling frequency is set as a smallest value of a desirable variable range and the frequency time is changed within the variable range according to the numerical value selected by the random generating means.

If the state quantity sampling means is constructed so that the weighted mean of the sampled state quantity is calculated, even if the sampled value is caused to pulsate by the influence of the pulsation of sucked air, the final detected value is set while abating the pulsation.

In the above-mentioned structure, where the weighted mean is calculated, if the weighting load setting means is constructed so that the weighting load variably sets the weighting load on the calculation of the weighted mean by the state quantity sampling means based on the discrimination by means for discriminating the stationary driving states or transient driving, good avoidance of the influence of the pulsation at the stationary driving state and good maintenance of the detection responsibility at the transient driving state can be realized.

DETAILED DESCRIPTION OF THE PREFERRED EMBODIMENTS

Figure 1:
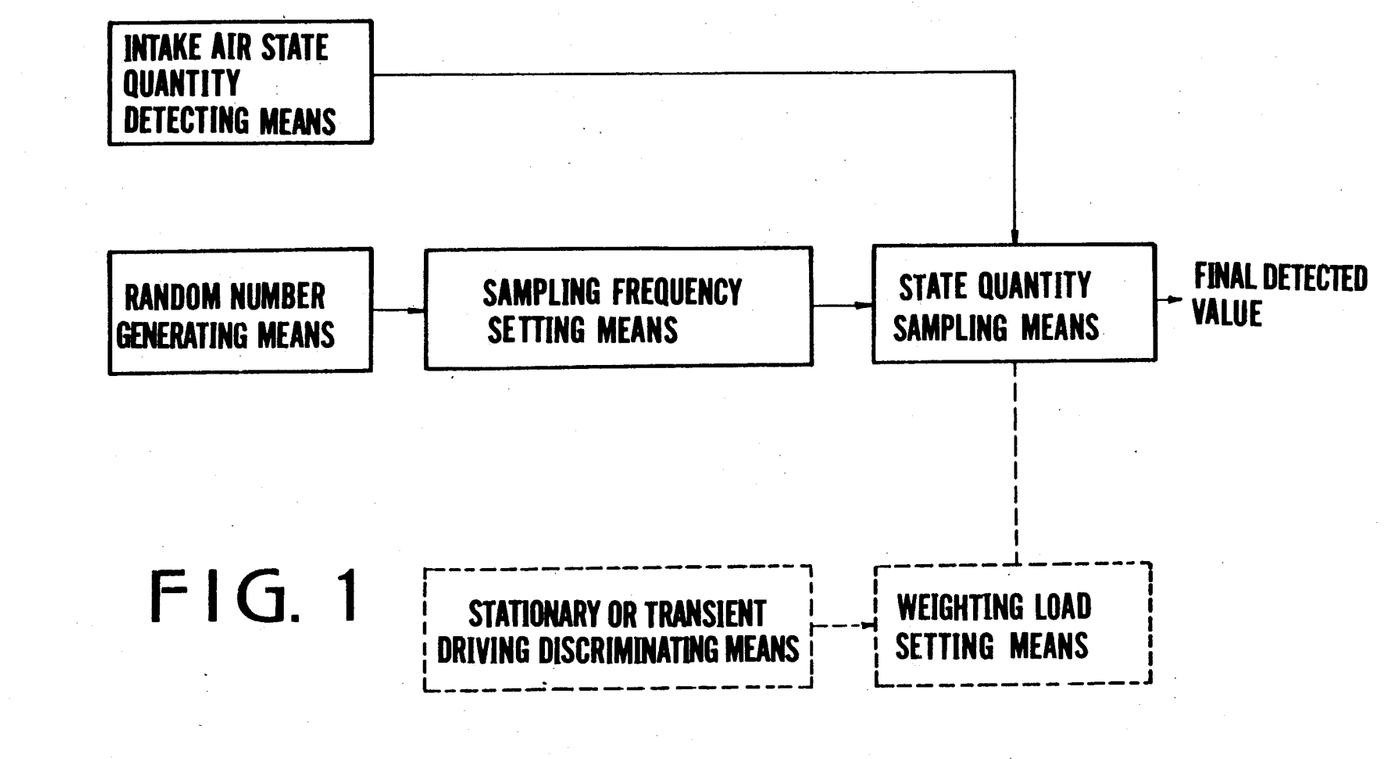
FIG. 1 is a block diagram illustrating the structure of the apparatus for detecting a quantity of the state of sucked air according to the present invention.

The structure of the present invention is outlined in FIG. 1, and an embodiment of the present invention is illustrated in FIGS. 2 through 5.

Figure 2:
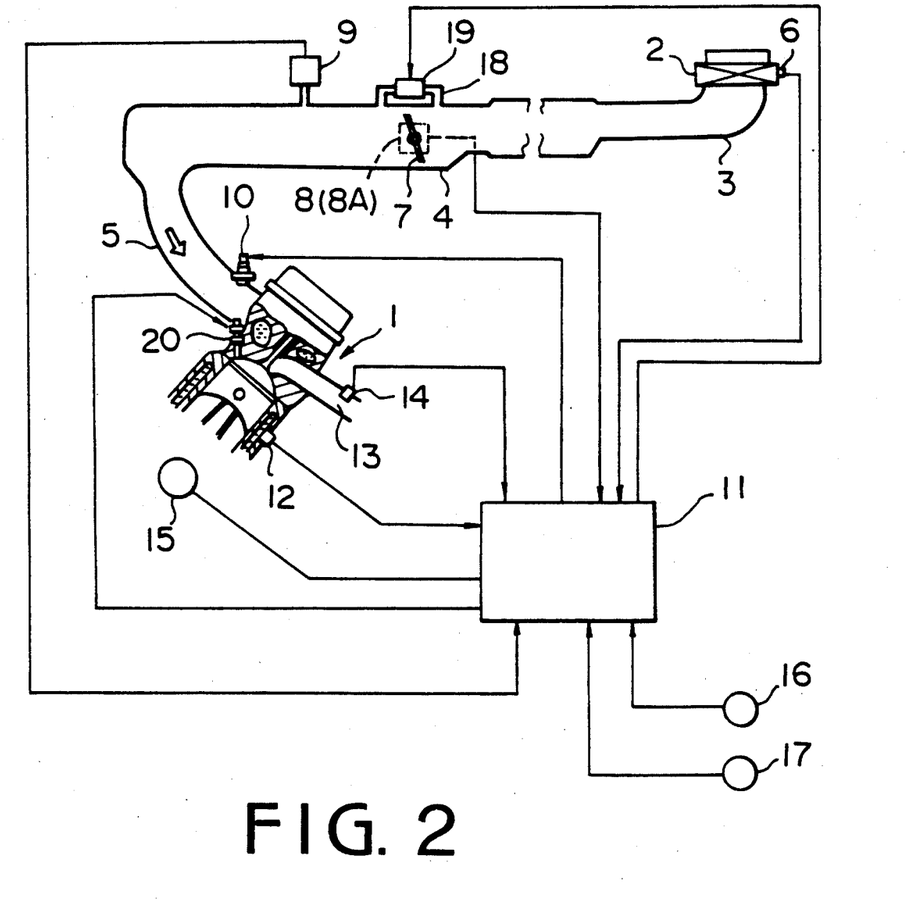
FIG. 2 is a diagram illustrating the system outline of an embodiment of the present invention.

Referring to FIG. 2, air is sucked into an internal combustion engine 1 through an air cleaner 2, an intake duct 3, a throttle chamber 4 and a manifold 5. An intake air temperature sensor 6 for detecting a temperature TA (°C.) of sucked air (open air) is arranged in the air cleaner 2. A throttle valve 7 cooperating with an accelerator pedal not shown in the drawings is arranged in the throttle chamber 4 to control the flow quantity Q of sucked air. A throttle sensor 8 including a potentiometer for detecting the opening degree TVO of the throttle valve 7 and an idling switch 8A to be turned on at the fully closed position (idling position) of the throttle valve 7 are attached to the throttle valve 7. An intake pressure sensor 9 corresponding to intake air state quantity detecting means for detecting an intake pressure PB as the state quantity of sucked air, which participates in the quantity of air sucked in the engine, is arranged in the intake manifold 5 disposed downstream of the throttle valve 7. A fuel injection valve 10 of the electromagnetic type is arranged in each cylinder. The fuel injection valve 10 is driven and opened by a driving pulse signal put out synchronously with, for example, an ignition timing from a control unit 11 in which a microcomputer described below is disposed, and jets and supplies a fuel fed under pressure from a fuel pump not shown in the drawings and having the pressure thereof controlled to a predetermined level into the intake manifold 5. The quantity of the fuel supplied by the fuel injection valve 10 is controlled by the opening time of the fuel injection valve 10.

A water temperature sensor 12 for detecting a cooling water temperature Tw in a cooling jacket of the engine 1 is arranged, and an oxygen sensor 14 is arranged to the air-fuel ratio of a sucked air-fuel mixture by detecting the oxygen concentration in the exhaust gas in an exhaust path 13.

The control unit 11 counts for a predetermined time a crank unit angle signal POS put out synchronously with the revolution of the engine from a crank angle sensor 15, or measures the frequency of a crank reference angle signal REF put out at every predetermined crank angle (every 180° in case of a four-cylinder engine), to detect the engine revolution speed N.

A vehicle speed sensor 16 for detecting the vehicle speed and a neutral sensor 17 for detecting the neutral position are arranged in a transmission attached to the engine 1, and signals from these sensors are put into the control unit 11.

An idling control valve 19 of the electromagnetic type for controlling the idling revolution speed through the quantity of auxiliary air is arranged in an auxiliary air path 18 bypassing the throttle valve 7, and an ignition plug 20 is disposed in a combustion chamber of each cylinder.

The control unit 11, which is a structional element of the intake air state quantity detecting apparatus of the present invention, performs sampling processing of the intake pressure PB detected by the intake pressure sensor 9 for a predetermined frequency time and computes the fuel injection quantity Ti (the pulse width of the injection pulse) based on the sampled intake pressure PB and other detected engine driving states, and simultaneously, the control unit 11 controls the driving and opening of the fuel injection valve 10 based on the set fuel injection quantity Ti. Furthermore, the control unit 11 controls the opening degree of the idling control valve at the idling driving state detected by the idling switch 8A and neutral sensor 17 to perform the feed-back control of the idling speed to an aimed level. Still further, the control unit 11 controls the ignition timing ADV by the ignition plug 20.

The operational processing of the fuel injection quantity, including the sampling processing of the intake pressure PB, executed by the control unit 11, will now be described with reference to routines shown in the flow charts of FIGS. 3 through 5.

Figure 3:
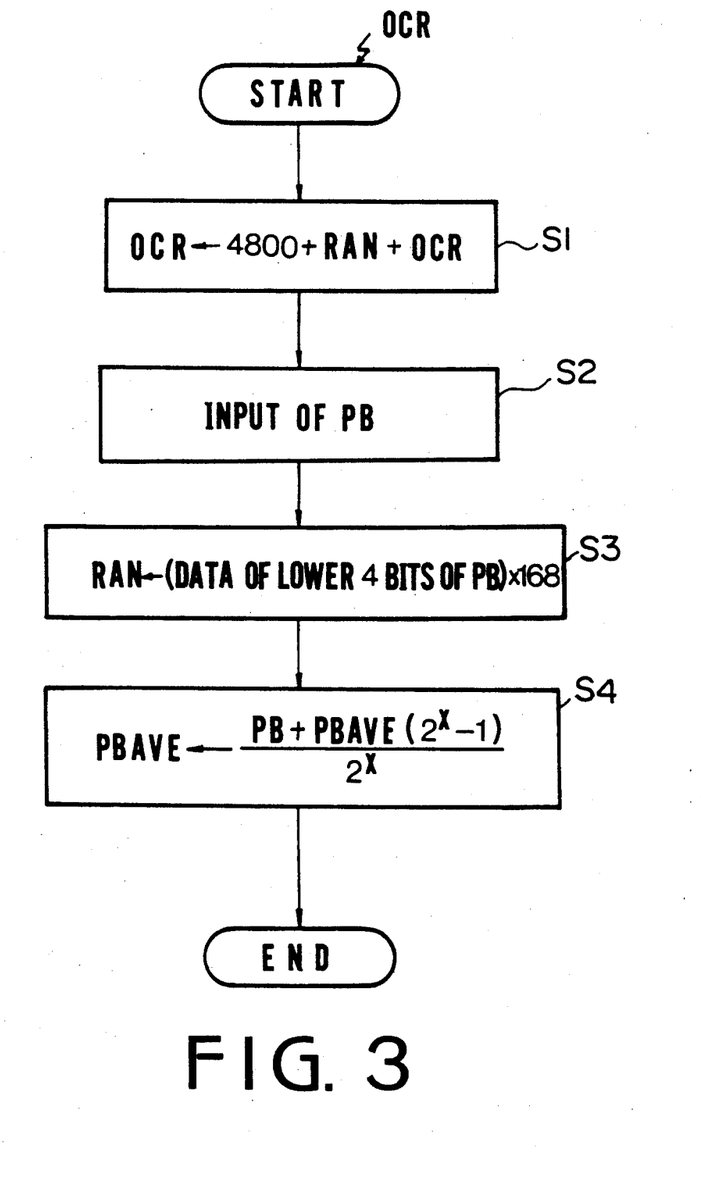
FIGS. 3 through 5 are flow charts illustrating control contents in the embodiment shown in FIG. 2.
Figure 4:
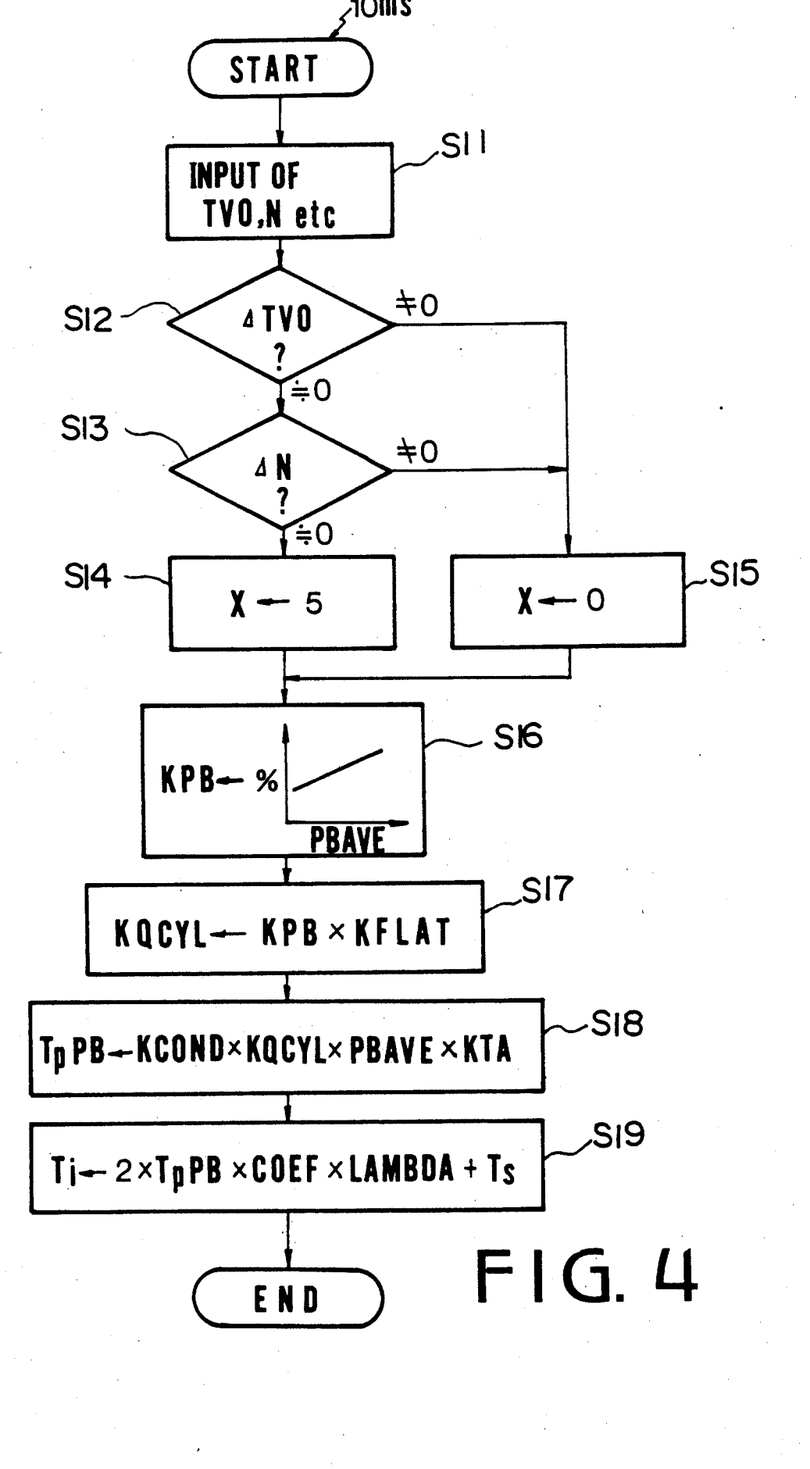
Figure 5:
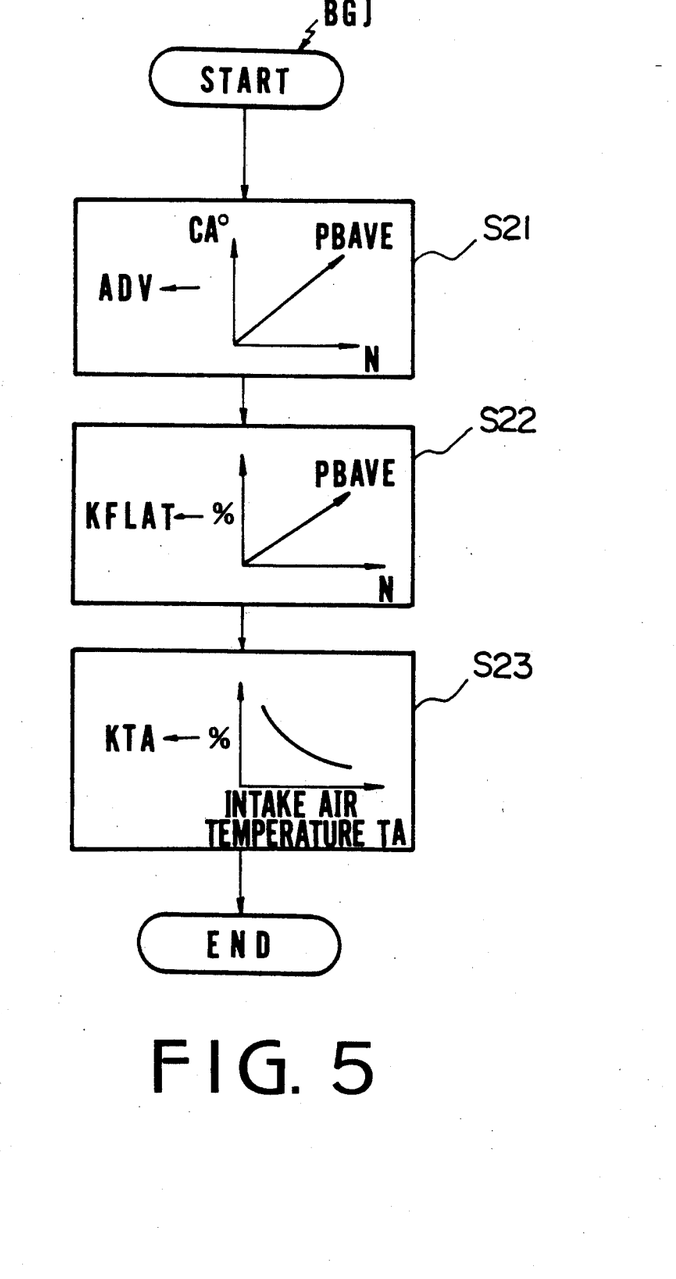

In the present embodiment, the random number generating means, sampling frequency setting means, state quantity sampling means and weighting load setting means are disposed to act as software as shown in the flow charts of FIGS. 3 through 5. In the present invention, the crank angle sensor 15 and throttle sensor 8 correspond to the means for discriminating the stationary driving state or transient driving state.

The routine shown in FIG. 3 is an interruption routine to be executed when the count value of a free run counter (now shown) built in the control unit 11 becomes a predetermined value OCR. According to this routine, the intake pressure PB, detected by the intake pressure sensor 9, PB is sampled and the weighted mean of the sampled value is calculated to set a final detected value PBAVE of the intake pressure PB.

At first, at step 1 (S1 in the drawings; the same will apply hereinafter), the predetermined value OCR defining the next execution time of the present routine is set according to the following formula:

$$OCR \leftarrow 4800 + RAN + OCR$$

In the above formula, OCR represents the OCR value set at step 1 at the previous execution of the present routine, and the present routine is executed when the count value of the free run counter becomes equal to the OCR value at the preceding execution. RAN represents the random number set at step 3, described hereinafter, at the time of the preceding execution. In the present invention, the number is increased from 0 every 168 to 2520 as the maximum value. Furthermore, 4800 is the value corresponding to the preliminarily set fixed time of the sampling frequency. Since the present embodiment is constructed so that the value of the free run counter is counted up by one every $\frac{2}{3}$ μs, 4800 corresponds to 3.2 ms (=4800×$\frac{2}{3}$=3200 μs), and the maximum value 2520 of the random number RAN corresponds to 1.68 ms (=2520×$\frac{2}{3}$=1680 μs). Accordingly, the minimum value of (4800+RAN) is 3.2 ms and the maximum value is 4.88 ms (=3.2 ms+1.68 ms).

When the predetermined value OCR newly calculated according to the above operational formula becomes in agreement with the value of the free run counter, subsequent interruption execution of the present routine is effected.

At the next step 2, an analog electric signal put out from the intake pressure sensor 9 according to the intake pressure is A/D-converted and read as 2-byte digital data into the control unit.

At step 3, data of the lower 4 bits in the 2-byte data read at step 2 is multiplied by the predetermined value of 168 to set the random number RAN for variably changing the time of an interval to the execution of the present routine. Since as the lower 4-bit data of the intake pressure PB, one value is selected from 16 values of from 0 to 15 in the substantially same probability irrespective of the intensity of the PB pressure, the present routine is executed at a random frequency time within a predetermined time range by the random number RAN.

In the present embodiment, since it is preliminarily set that the execution frequency time of the present embodiment is changed in the range of from 3.2 ms to 4.88 ms, the change width of 1.68 ms (=4.88 ms−3.2 ms) corresponds to the count number of 2520 (=1680×3/2) of the free counter and since the maximum value of the lower 4-bit data of the intake pressure PB, the fixed value of 168=(2520/15) is used for the calculation of the random number RAN.

Accordingly, if the lower 4-bit data of the intake pressure PB is, for example, 2, the random number RAN is 336(=2×168), and the sum of the random number and 4800 is 5136 (=4800+336), and the interruption execution of the present routine is effected again after 3.424 ms (5136×$\frac{2}{3}$=3424 μs). Namely, the execution frequency of the present routine is randomly changed in the range of from 3.2 ms to 4.88 ms by the unit of 0.112 ms (=168×$\frac{2}{3}$=112 μs).

The random number RAN can be generated based on the lower bit data of the intake pressure PB, as in the present embodiment, but the lower bit data of the free run counter can be similarly utilized. In each case, random number generators need not be individually disposed and the structure can be simplified.

After the random number RAN is set at step 3, the weighted mean of the intake pressure PB is calculated at step 4 according to the following formula:

$$PBAVE \leftarrow \frac{PB + PBAVE(2^x - 1)}{2^x}$$

In the above formula, PB represents the newest detected value put into the control unit at step 2, and the weighted mean of this newest detected value of the final detected value PBAVE obtained by the weighted averaging at step 4 at the previous execution of the present routine and $2^x$ represents the weighting load (weighting degree) to the preceding value.

In the present embodiment, as described hereinbefore, the time of the sampling frequency of the intake pressure PB is randomly set in the range of from 3.2 ms to 4.88 ms by the unit of 0.112 ms, and therefore, the frequency of the pulsation of the intake pressure PB is substantially prevented from being synchronous with the sampling frequency and sampling of only the peak value of the pulsation of the intake pressure PB is avoided. Furthermore, when the intake pressure PB pulsates at a certain frequency, gradual regular shifting of the sampling point is not caused, and the sampled intake pressure PB is prevented from pulsating at a long-period frequency.

Moreover, though the time of the sampling frequency changes, the range of the change is very narrow, and since the intake pressure PB is sampled every short time in each case, a good detection responsibility can be maintained even at the transient driving state where the intake pressure PB changes.

Still further, even if the sampled intake pressure PB pulsates under the influence of the pulsation of the pressure, the frequency of this pulsation is not substantially longer than the frequency of the pulsation of the pressure, and therefore, if the weighted mean is calculated as in the present embodiment, the pulsation can be advantageously attenuated.

Still in addition, since it is sufficient if the time of the sampling frequency is randomly changed, only matching of the change range of the frequent time suffices, and a large number of matching steps are not necessary.

The final detected value PBAVE, which is set based on the weighted mean calculated according to the routine shown in the flow chart of FIG. 3, is used for setting and controlling the fuel injection quantity Ti and the ignition timing ADV according to routines shown in flow charts of FIGS. 4 and 5.

The routine shown in the flow chart of FIG. 4 is executed every 10 ms. At step 11, the opening degree TVO of the throttle valve detected by the throttle sensor 8 and the engine revolution number N calculated based on the detection signal put out from the crank angle sensor 15 are put into the control unit.

Then, at step 12, it is discriminated whether or not the difference ΔTVO between the throttle valve opening degree TVO newly put into the control unit at step 11 and the preceding TVO value is substantially zero. When ΔTVO is substantially zero and the throttle valve 7 is in the state of stable opening the routine goes into step 13, but when ΔTVO is not substantially zero and the throttle valve 7 performs the opening-closing operation, the engine 1 is regarded as being in the transient driving state, and the routine goes into step 15.

At step 13, it is discriminated whether or not the difference ΔN between the engine revolution number N newly put into the control unit at step 11 and the preceding input value is substantially zero. When it is judged that N is substantially zero, since the opening degree TVO of the throttle valve 7 is stable and the engine revolution number N is constant, the engine 1 is regarded as being in the stationary driving state and the routine goes into step 14. On the other hand, when it is judged at step 13 that ΔN is not substantially zero, the engine revolution number N changes even though the opening degree TVO of the throttle valve 7 is stable, and also at this time, the engine 1 is regarded as being in the transient driving state and the routine goes into step 15.

When it is judged that the engine 1 is in the stationary driving state and the routine goes into step 14, 5 is set at the exponent X of $2^x$ determining the weighting load on the past data in the calculation of the weighted mean of the intake pressure PB. When it is judged that the engine 1 is in the transient driving state and no pulsation is generated in the sucked air, the exponent X is set at zero at step 15. If the exponent X is set at zero, the final detected value PBAVE becomes equal to the newest detected value PB, and a good detection responsibility is maintained at the transient driving state. If the exponent X is set at 5, the newest detected value PB is calculated for the weighted mean according to $2^x$ and the pulsation is attenuated.

If the exponent X used in determining the weighting load $2^x$ according to the stationary driving states or transient driving of the engine 1, is thus set, at the next step 16, the basic volume efficient correction coefficient KPB (%) is retrieved from a preliminarily set map based on the final detected value (the result of the calculation of the weighted mean) PBAVE of the intake pressure PB.

At the next step 17, the basic volume efficiency correction coefficient KPB retrieved at step 16 is multiplied by the volume efficiency minute correction coefficient KFLAT, retrieved from a map at a background job described hereinafter, to set the volume efficiency correction coefficient KQCYL.

Then, at step 18, the basic fuel injection quantity TpPB based on the intake pressure PBAVE is calculated according to the following formula:

TpPB←KCOND×KQCYL×PBAVE×KTA

In the above formula, KCOND is a constant, KQCYL is the volume efficiency correction coefficient calculated at step 17, PBAVE is the final detected value of the intake pressure PB set by the calculation of the weighted mean of every sampling efficiency variably set based on the random number RAN, and KTA is the sucked air temperature correction coefficient retrieved from a map at the background job described hereinafter. Incidentally, the intake pressure PBAVE used for the calculation of the basic fuel injection quantity TpPB is excellent in the detection responsibility at the transient driving state and the sampling precision of PBAVE is excellent with no influence from the pulsation, as pointed out hereinbefore, and therefore, the basic fuel injection quantity TpPB is well matched to the quantity required by the engine 1.

At the next step 19, various corrections are made to the basic fuel injection quantity TpPB calculated at step 18 according to the driving state of the engine and the final fuel injection quantity Ti is calculated by the following formula:

Ti←2×TpPb×COEF×LAMBDA×Ts

In the above formula, COEF represents various correction coefficients set mainly based on the cooling water temperature Tw detected by the water temperature sensor 12, LAMBDA represents the air-fuel ratio feedback correction coefficient set so that the air-fuel ratio in the air-fuel mixture sucked into the engine, determined through the oxygen concentration in the exhaust gas detected by the oxygen sensor 14, is brought close to an aimed air-fuel ratio (theoretical air-fuel ratio), and Ts represents a correction to be added for correcting the change of the invalid injection quantity by the battery voltage.

Thus the set fuel injection quantity Ti is set in an output register of the control unit 11, and at the predetermined fuel injection timing the newest fuel injection quantity Ti, set in the output register, is read out and a fuel injection pulse signal having a pulse width corresponding to Ti is transmitted to the fuel injection valve 10. The fuel injection valve 10 is then opened for a time corresponding to Ti and the fuel is injected and supplied to the engine 1.

The routine shown in the flow chart of FIG. 5 is a routine executed as the background job (BGJ). At step 21, the ignition timing (ignition advance value) is retrieved from a map based on the intake pressure PBAVE, determined by the calculation of the weighted mean at step 4, and the engine revolution speed N. The intake pressure PBAVE used for retrieving the ignition timing ADV is excellent in the sampling precision by the variable control of the sampling frequency time based on the above-mentioned random number RAN, and therefore, a high precision is guaranteed for the set ignition timing ADV.

According to the retrieved ignition timing ADV, the control unit 11 counts, for example, the unit angle single POS from the reference angle signal REF put out from the crank angle sensor 15 to determine the ignition timing ADV, add at the ignition timing ADV, the control unit 11 puts out an ignition control signal to the ignition plug 20 to effect the ignition.

At step 22, the volume efficiency minute correction coefficient KFLAT, used for calculating the volume efficiency correction coefficient KQCYL, is retrieved from a map based on the intake pressure PBAVE and engine revolution number N.

At the next step 23, the sucked air temperature correction coefficient KTA, used for the calculation of the basic fuel injection quantity TpPB, is retrieved from a map based on the temperature TA of sucked air detected by the sucked air temperature sensor 6.

The present embodiment has been described with reference to the engine provided with the intake pressure sensor 9 for detecting the intake pressure PB. However, a similar effect can also be attained if an air flow meter for detecting the sucked air flow quantity Q as the quantity of the intake air state participating in the quantity of air sucked in the engine is arranged instead of the intake pressure sensor 9 and the sucked air flow quantity Q detected by the air flow meter is subjected to sampling processing in the same manner as in the above-mentioned embodiment.

I claim:

1. A method for detecting an intake air state quantity in an internal combustion engine, which comprises sampling at every predetermined time a detected value of an intake air state quantity participating in the quantity of sucked air in the internal combustion engine, wherein a random number is generated and the time of the sampling frequency is variably set based on the generated random number.

2. A method for detecting an intake air state quantity in an internal combustion engine according to claim 1, wherein the random number is generated based on lower order data of the detected value of the intake air quantity or lower order data of a meter for measuring the time of the sampling frequency.

3. A method for detecting an intake air state quantity in an internal combustion engine according to claim 1, wherein the time of the sampling frequency is set based on the sum of the above-mentioned random number and a predetermined fixed frequency time.

4. A method for detecting an intake air state quantity in an internal combustion engine according to claim 1, wherein a weighted mean value of detected values of the intake air state quantity sampled at every frequency time variably set based on the random number is calculated and the weighted mean value is set as the final sampled value.

5. A method for detecting an intake air state quantity in an internal combustion engine according to claim 1, wherein the weighted mean is calculated by changing over the weighting load according to the discrimination of the stationary or transient driving of the engine, and the weighted mean is set as the final sampled value.

6. A method for detecting an intake air state quantity in an internal combustion engine according to claim 1, wherein the time of the sampling frequency is variably set by variably setting the frequency of execution of the program for sample processing of the intake air state quantity based on the above-mentioned random number.

7. An apparatus for detecting an intake air state quantity in an internal combustion engine, which comprises intake air state quantity detecting means for detecting a quantity of a state of intake air which participates in the quantity of air sucked in the engine, random number generating means for selecting one numerical value among a plurality of numerical values in the substantially same probability, sampling frequency setting means for setting the time of the frequency of sampling the intake air state quantity, and state quantity sampling means actuated according to the sampling frequency time set by the sampling frequency setting means to subject the state quantity detected by the intake air state quantity detecting means to sampling processing and set the value obtained by the sample processing as a final detected value.

8. An apparatus for detecting an intake air state quantity in an internal combustion engine according to claim 7, wherein the random number generating means is constructed so that a numerical value is selected based on lower order data of the state quantity detected by the intake air state quantity detecting means or lower order data of a meter for measuring the working frequency of the state quantity sampling means.

9. An apparatus for detecting an intake air state quantity in an internal combustion engine according to claim 7, wherein the sampling frequency setting means is constructed so that the sampling frequency is set based on the sum of the numerical value selected by the random number generating means and the fixed time of the sampling frequency.

10. An apparatus for detecting an intake air state quantity in an internal combustion engine according to claim 7, wherein the state quantity sampling means is constructed so that the weighted means of the state quantity of intake air detected by the intake air state quantity detecting means is set as the final detected value.

11. An apparatus for detecting an intake air state quantity in an internal combustion engine according to claim 7, wherein the state quantity sampling means is constructed so that the weighted means of the state quantity of intake air detected by the intake air state quantity detecting means is set as the final detected value, and driving state discriminating means for discriminating the stationary driving or transient driving state of the internal combustion engine and weighting load setting means for variably setting the weighting load for the calculation of the weighted mean by the state quantity sampling means according to the discrimination made by the driving state discriminating means are further arranged.

* * * * *